United States Patent
Hanulik

[11] Patent Number: 6,024,931
[45] Date of Patent: Feb. 15, 2000

[54] PROCESS FOR REMOVING MERCURY FROM MERCURY CONTAMINATED MATERIALS

[75] Inventor: Jozef Hanulik, Zürich, Switzerland

[73] Assignee: Deco-Hanulik AG, Zürich, Switzerland

[21] Appl. No.: 08/983,297

[22] PCT Filed: Jul. 8, 1996

[86] PCT No.: PCT/CH96/00252

§ 371 Date: May 15, 1998

§ 102(e) Date: May 15, 1998

[87] PCT Pub. No.: WO97/02864

PCT Pub. Date: Jan. 30, 1997

[30] Foreign Application Priority Data

Jul. 10, 1995 [CH] Switzerland ............... 2002/95

[51] Int. Cl.[7] ............... C01G 13/00; C22B 43/00
[52] U.S. Cl. ............... 423/107; 423/108; 588/234; 588/223
[58] Field of Search ............... 423/107, 108; 588/234, 223; 110/188, 190, 345; 75/670; 210/512.2

[56] References Cited

U.S. PATENT DOCUMENTS

| | | | |
|---|---|---|---|
| 2,186,876 | 1/1940 | Menardi | 423/107 |
| 3,615,363 | 10/1971 | Montes De Oca | 75/81 |
| 4,087,276 | 5/1978 | Generini | 75/81 |
| 4,468,011 | 8/1984 | Sikander et al. | 266/149 |
| 4,640,751 | 2/1987 | Dyvik et al. | 423/107 |
| 4,861,262 | 8/1989 | Gitman et al. | 431/5 |
| 4,974,530 | 12/1990 | Lyon | 110/346 |
| 4,986,197 | 1/1991 | Kent | 110/246 |
| 5,046,435 | 9/1991 | Kugler | 110/346 |
| 5,184,950 | 2/1993 | Fraysse et al. | 432/13 |
| 5,569,154 | 10/1996 | Navetta | 588/256 |
| 5,619,936 | 4/1997 | Veltmann | 110/345 |

FOREIGN PATENT DOCUMENTS

| | | |
|---|---|---|
| 0423039 | 4/1991 | European Pat. Off. . |
| 4243313 | 6/1994 | Germany . |
| 61018487 | 6/1986 | Japan . |
| 61061687 | 8/1986 | Japan . |
| 94/06946 | 3/1994 | WIPO ............... 588/234 |

OTHER PUBLICATIONS

C.P. Broadbent, F.P. Berkenhagen, V.G. Aurich and K.J. Rots, *High Temperature Oxidation Process for Decontamination of Mercury Containing Wastes, Aufbereitungs Technik*, vol. 35, No. 6, Jun. 1, 1994, pp. 299–306.

*Primary Examiner*—Steven Bos
*Attorney, Agent, or Firm*—Pauley Petersen Kinne & Fejer

[57] ABSTRACT

Mercury-contaminated substances are fed through a shredder to a loader that loads a rotary tubular kiln, in which a mercury content is evaporated by a primary burner. A temperature of an unlined rotary kiln is monitored from an outside at various points over an entire length, by infrared sensors. The thus acquired data are supplied to a regulating unit that regulates fuel supply and primary air supply through various control lines. Burned gas is supplied through a duct to a cyclone separator in which solids are separated and returned to the process. The gaseous substances are fed through a postcombustion chamber of a quench to a washer in which mercury is removed. The residual gas reaches a chimney through an active coal filter. This process is particularly easy to control, economical and allows a particularly low residual mercury content to be reached, for example less than 0.1 ppm, in a residual combustion product.

10 Claims, 1 Drawing Sheet

PROCESS FOR REMOVING MERCURY FROM MERCURY CONTAMINATED MATERIALS

BACKGROUND OF THE INVENTION

1. Field of the Invention

This invention relates to a process for removing mercury from organic, mineral and/or metallic materials contaminated with mercury, using a thermal treatment in a kiln, wherein the mercury components evaporate, are subsequently washed out of the combustion gases and are separated.

2. Description of Prior Art

Enormous amounts of mercury-contaminated old scrap are known to be all over the world. In part, this scrap comes from electrolysis installations for producing alkaline metals or chlorine, from old waste dumps and from disposal companies which are inappropriately run. Due to a great danger of the spread of mercury, not only are the actual production facilities contaminated, but in most cases so are all the buildings, the surrounding ground, furniture, cables, etc. Added to this is greatly contaminated waste, such as reject production batches, and waste from dentistry. Correspondingly the materials to be decontaminated include mineral and/or metallic materials. Added to this are organic components, such as paper, wood, plastics, which can also be contaminated by mercury.

An important cost item when removing mercury is the determination of the extent of contamination. The analysis to be carried out is time-consuming and correspondingly expensive and, in particular in connection with buildings and installations, must take place in a surface-covering pattern. If the costs of mercury removal can be considerably lowered, it is less expensive to reduce the number of measurements and instead to decontaminate in a surface-covering manner.

SUMMARY OF THE INVENTION

It is therefore one object of this invention to provide a particularly cost-efficient process for mercury removal, which in addition results in a particularly high degree of mercury removal.

This object is attained by a process as described in the specification and in the claims.

Besides the thermal treatment processes for mercury removal, chemical extraction installations for mercury removal are known. These known installations are extremely expensive and are mostly only suitable for small amounts of materials to be decontaminated. If the initial materials to be decontaminated are a mixture, it is difficult to realize a product purity of less than 20 ppm Hg.

Various thermal mercury removal installations are known. These known installations operate by indirectly heated electric or gas kilns, wherein heating takes place from an exterior source. The evaporated mercury must be evacuated from the kiln. Thus the kiln is flushed with nitrogen or air in several cycles and afterwards evacuated again. Depending on the number of the alternatingly performed evacuations and flushings, a purity of less than 1 ppm can be achieved. The decontamination costs run to approximately 10 to 20,000 DM/t.

It would be possible in principle to perform a mercury removal process with a multiple-hearth kiln. However, tests performed by the inventor have shown that such a kiln is less suitable for this purpose, since the diffusion paths in a multiple-hearth kiln are relatively long. The process takes place at relatively high temperatures of more than 800° C., and the retention time in the kiln of the materials to be decontaminated must be very long, at least several hours. The construction and maintenance of multiple-hearth kilns is very expensive.

Some attempts for mercury removal in rotating kilns have been made, but the results were not convincing and accordingly a large industrial installation has not yet been realized. Known rotating kilns, which are lined with fire-resistant mineral materials, were employed in these attempts. A great amount of abrasion took place at the mineral lining, which correspondingly burdens the end products. This is a particular problem if the basic materials to be decontaminated are free of mineral materials. The end product obtained by the process then is accordingly greatly burdened with mineral materials. The rotating kilns lined with minerals lead to making the process inflexible, because the kiln can only be slowly started and turned off, since temperature shocks lead to the destruction of the mineral lining. The corresponding sluggishness of the process makes it hard to control and regulate the process. With this process, temperature measurements can only be performed at the inlet and outlet of the rotating kiln. If materials which burn strongly exothermally, reach the kiln, there is a great danger of overheating, wherein a melt-through of the kiln cannot be discounted.

The process in accordance with this invention, however, operates with a non-lined rotating tubular kiln, which is also not insulated from the outside, so that the temperature regulation in the rotating tubular kiln can be monitored from the outside by heat sensors along the entire conveying path in the rotating tubular kiln, and the temperature regulation can be correspondingly precisely controlled by the air supply. In comparison with known processes, the process in accordance with this invention operates very much quicker, is more cost-effective and the energy consumption is considerably lower in comparison with known processes.

Further advantageous embodiments of the process are set forth in the claims, whose importance will be explained in the specification.

BRIEF DESCRIPTION OF THE DRAWING

A flow chart of the process is represented in the attached single drawing FIGURE.

DESCRIPTION OF PREFERRED EMBODIMENTS

Figure 1:
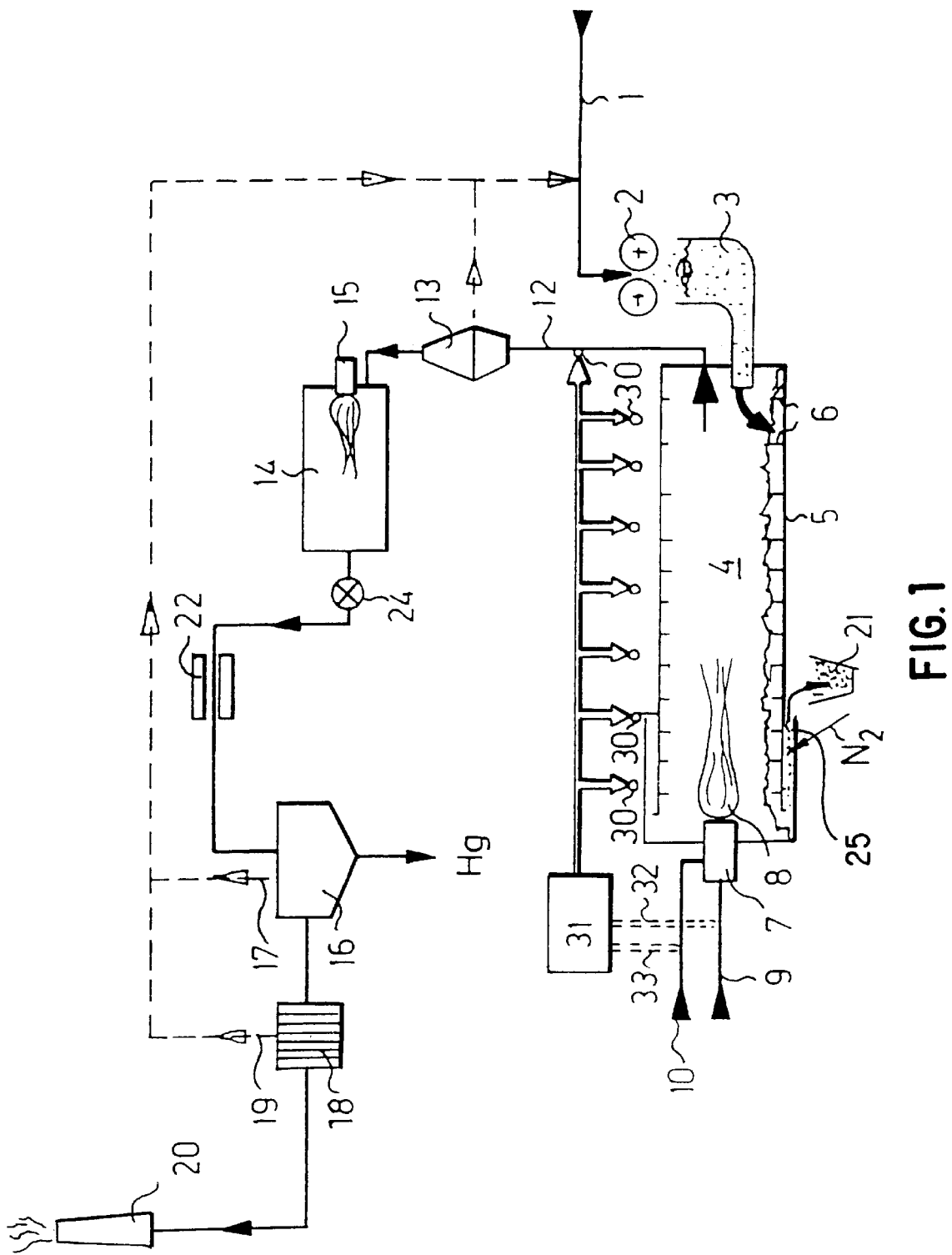

The available material to be decontaminated is conducted through a supply line 1 to a comminution device 2 at which the materials to be decontaminated are shredded, ground or cut or otherwise commminuted. In principle, the kiln can be charged with any arbitrary material mixture. However, it is advantageous to take the different mercury diffusion times of the various materials into consideration and accordingly to comminute mineral materials, for example, to a grain size of approximately 5 mm, while with metallic parts sizes of up to 100 mm are quite permissible. The comminuted material reaches a charging device 3 having a minimal storage bunker for assuring as even as possible continuous charging of the kiln.

The actual charging kiln is identified by element reference numeral 4. Rotating tubular kilns of this type are known per se and have been used for years for the drying or incineration of communal or industrial sludge. This is mainly sewage and soil sludge or materials retained on a trash rack, or respectively oil and paint sludge which are to be removed. The interior of the rotating tubular kiln 4 is not lined. The kiln 4 is also not insulated from the outside. The kiln 4 is accordingly cooled by the exterior atmosphere. Thus the radiated heat of the unlined rotating tube 5 gives a direct indication of the temperatures prevailing in the rotating tubular kiln which can be determined directly from the radiated heat of the rotating tube 5. A primary burner 7 is arranged on the end of the rotating tube kiln 4 opposite the charging device 3. The primary burner 7 generates a flame 8. The material to be decontaminated passes through the kiln 4 in the so-called countercurrent direction, i.e. in a direction moving toward the flame 8. The temperature in the kiln 4 can be regulated by the fuel supply 9 or by the primary air supply. The temperature in the rotating tubular kiln 4 is essentially determined by the type of material to be decontaminated. The temperatures in the kiln 4 interior range between approximately 600 and 900° C. An important indicator in particular is the temperature of the gases exiting the kiln 4. These should be between 500 and 850° C. A temperature around 650° C. is preferred. Under these conditions the temperature of the kiln 4 wall on the inside is approximately 500° C., while the outside temperature of the kiln 4 wall is approximately 250 to 300° C.

Oxidative combustion takes place in the rotating tube kiln 4 at the above mentioned temperatures, wherein the mercury evaporates and is removed with the gases. The combustion products removed after combustion have a remaining burden of less than 0.1 ppm Hg. If this purity is not required, the process can also be executed in such a way that the maximum burden of the output product lies below 1 ppm, or in certain cases below 5 ppm. The removed combustion products are collected in an ash catcher device 21. In the simplest case these combustion products can be removed directly from the rotating tube 5 of the kiln 4. However, it is also possible to turn around the combustion products with the mercury already removed at the end of the rotating tube 5 of the kiln 4 and to remove the combustion products through an outlet gap 25 during movement and with the air excluded. The latter variant results in a slower cooling of the combustion products, wherein chlorine removal takes place. Since sealing a rotating tube kiln is not without its problems, combustion or respectively oxidation in the area of the outlet gap can be prevented by the introduction of inert gases, for example nitrogen. In this way a simultaneous decomposition of the remaining amounts of PCB and remaining dioxins takes place. In comparison with a direct removal of the combustion products, the combustion products removed under exclusion of the air have approximately 95% fewer remaining dioxins and PCBs.

The gases flowing out at the material feed side are passed through the exhaust 12 to the cyclone 13. The gases are preferably drawn off by at least one ventilator or a pump 24 upstream and downstream of the afterburner chamber 14. Thus an underpressure is generated in the rotating tube kiln 4, by means of which Hg contamination because of leaks is prevented. The solids in the combustion gases are separated in the cyclone 13. These solids, which possibly could contain a small amount of mercury, are directly returned into the process from the cyclone 13. The combustion gases, which are now approximately free of solids, are conducted into an afterburner chamber 14, in which they are again heated to temperatures of approximately 800 to 1200° C. by means of a secondary burner, and are burned. In the process, traces of PCB and dioxins as well as other organic compounds are burned. The gases exiting the afterburner chamber 14 are quenched in a quencher 22 in order to stop undesired secondary reactions. The mercury vapors are washed out in a washer 16 and the mercury is removed. The wash water is neutralized from time to time, and the sedimented neutralization products are returned to the process via a return 17. The exhaust gases which are now clean to a large extent are passed through an activated charcoal filter 18 before the exhaust gases are removed through a chimney 20. The activated charcoal filters 18 burdened with Hg can also be conducted to the kiln 4 as shown by the return arrow 19.

The entire control of the process essentially takes place as a function of the temperatures prevailing in the rotating tube kiln 4. Therefore a plurality of infrared sensors 30 acting as temperature sensors are distributed outside the rotating tube kiln 4 over its entire length. A further temperature sensor can be arranged directly in the combustion gas exhaust line 12. The measurement data of all sensors 30 are conducted to a control unit 31, in which by means of a process computer in accordance with the fuel supply 9 and the primary air supply 10 is controlled.

Since all the combustion products being burned in the kiln pass through a complete decontamination and exhaust gas cleaning process, the burner 8 can also be charged with waste oil containing heavy metals or with oil sludge containing parts of mercury. This again increases the economic efficiency of the process. However, it should be noted that the process already has such a high degree of efficiency without this, that it is possible to count on operational costs for mercury removal of less the US$ 700/t at a throughput of 5000 t/year. With operating costs of US$ 700/t, the costs of this process are approximately ten times lower than known processes with the same low Hg content of the decontaminated materials. The second controllable value of the process is represented by the retention time in the rotating tube kiln 4 of the materials to be decontaminated. The speed of passage can be easily controlled by means of the rotating speed of the rotating tube kiln 4. The optimal rotating speed of the rotating tube kiln 4 is preferably between 0.5 and 3 rpm. The rotating speed also assures that the materials are sufficiently moved in the kiln 4 and fall sufficiently often in free fall through the hottest core of the interior of the kiln 4. As a third controllable value the throughput through the kiln 4 can be varied, wherein the packed bed thickness is appropriately varied and the retention time in the kiln 4 is correspondingly changed.

When used oil is employed for combustion in the primary burner 7 in particular, a sufficient thermal value is preferably achieved. Accordingly, it can be useful to admix further fuels to the used oil in order to increase the thermal value. Besides liquid fuels, gases are useful for this purpose.

If the rotating tube kiln 4 does not have a spiral-shaped conveying rib for conveying the material, the conveying speed can also be determined by the inclination of the rotating tube kiln 4.

Not only are the mercury contents effectively and completely removed by means of the process for mercury removal described, but amalgams are also completely destroyed and therefore mercury is removed at the same time.

Finally, the process operates particularly in an energy efficient manner. The process can be very quickly brought up to the required operating temperature and can also be turned off just as quickly. The rapid reaction of the kiln 4 to all control values and the optimal monitoring possibilities practically completely remove the danger of the kiln 4 burning through. The installation costs for the realization of the process in accordance with this invention are also considerably lower than the installation costs of comparable processes.

I claim:

1. In a process for removing mercury from at least one of organic, mineral metallic materials contaminated with mercury by thermal treatment in a kiln, wherein mercury components of the mercury contaminated materials evaporate and are subsequently washed out of combustion gases exiting the kiln to separate the mercury components from the combustion gases, wherein the contaminated materials are comminuted and are continuously fed into a non-lined rotating tube kiln through which the contaminated materials pass in a counterflow direction with respect to a flame direction with the kiln operating at a vacuum, the improvement comprising: performing the process in the non-lined rotating tube kiln having a rotating tube, at an outer wall temperature of 200° C. to 300° C., measuring a kiln temperature with a plurality of sensors distributed along an outside of the rotating tube kiln and regulating a temperature in a rotating tube kiln interior in an optimal temperature range with a primary air supply by feeding in oxygen and a fuel supply so that the combustion gases exiting the rotating tube kiln have a temperature between 500° C. and 850° C.

2. The process in accordance with claim 1, wherein combustion products of the mercury contaminated materials are directly removed from the rotating tube of the rotating tube kiln.

3. The process in accordance with claim 1, wherein combustion products of the mercury contaminated materials exit the rotating tube kiln through an outlet gap.

4. The process in accordance with claim 1, wherein the rotating tube is rotated at a rotating speed of 0.5 rpm to 3 rpm.

5. The process in accordance with claim 1, wherein combustion gases flowing out of the rotating tube kiln are first passed through a cyclone in which solids are separated and returned to the kiln.

6. The process in accordance with claim 5, wherein the combustion gases, from which the solids have been removed, are heated in an afterburner chamber at a temperature between 800° C. to 1200° C. to completely burn PCBs and dioxins as well as other organic compounds remaining in the combustion gases, after which heated exhaust gases are quenched to prevent a dioxin recombination.

7. The process in accordance with claim 1, wherein wash water with which the mercury is washed out of exhaust gases is neutralized and sedimented neutralization products are returned into the rotating tube kiln, and the mercury is separated.

8. The process in accordance with claim 1, wherein exhaust gases are passed through an activated charcoal filter to form a burdened activated charcoal filter and the burdened activated charcoal filter is returned to the rotating tube kiln and burned.

9. The process in accordance with claim 1, wherein the rotating tube kiln is fueled with used oil containing heavy metals.

10. The process in accordance with claim 1, wherein the rotating tube kiln is fired with gaseous or liquid fuels to which contaminated oil sludge is added.

* * * * *